United States Patent [19]
Garavelli

[11] 3,802,217
[45] Apr. 9, 1974

[54] ICE CREAM MAKING MACHINE
[75] Inventor: Giancarlo Garavelli, Milan, Italy
[73] Assignee: Isernia Aktiengesellschaft, Gamprin, Liechtenstein
[22] Filed: Feb. 11, 1972
[21] Appl. No.: 225,601

Related U.S. Application Data
[62] Division of Ser. No. 49,450, June 24, 1970, Pat. No. 3,724,234.

[30] Foreign Application Priority Data
July 2, 1969 Switzerland.................. 10114/69
Apr. 4, 1970 Switzerland.................. 4951/70

[52] U.S. Cl. ............................................. 62/306
[51] Int. Cl. ............................................. F25c 7/10
[58] Field of Search................ 62/69, 70, 306–308; 261/DIG. 7, 121 R; 222/4

[56] References Cited
UNITED STATES PATENTS
3,044,878  7/1962  Knedlik.......................... 62/306 X
3,656,316  4/1972  Stock............................ 62/306

Primary Examiner—William E. Wayner
Attorney, Agent, or Firm—D. Paul Weaver

[57] ABSTRACT

An ice cream making machine using disposable air tight containers for the mix, the container being placed under pressure by compressed gas, which thus causes the liquid to mix with the gas, the combination taking place at a molecular level, and which also causes the emulsion thus formed to be conveyed to the ice cream distributor.

3 Claims, 3 Drawing Figures

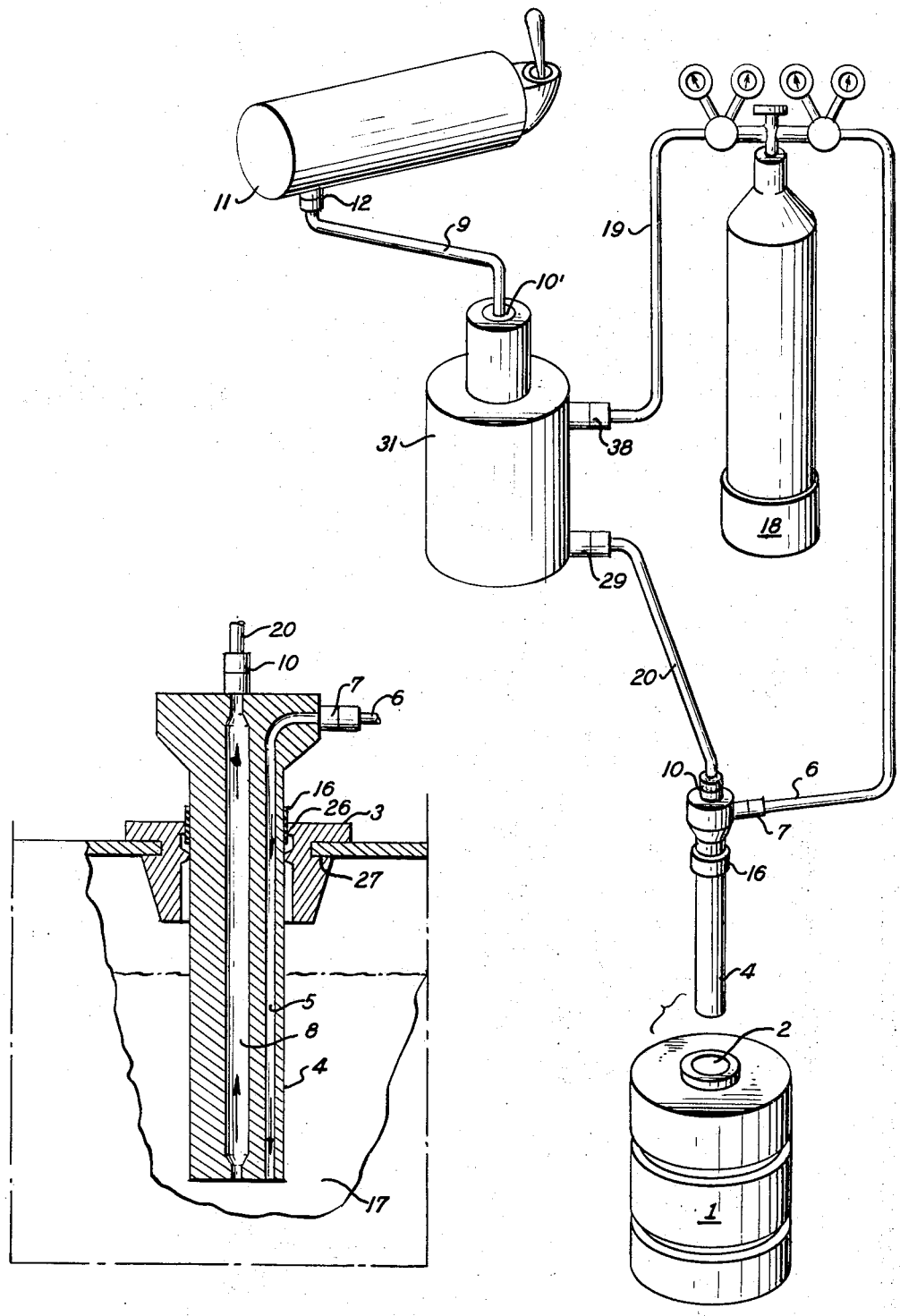

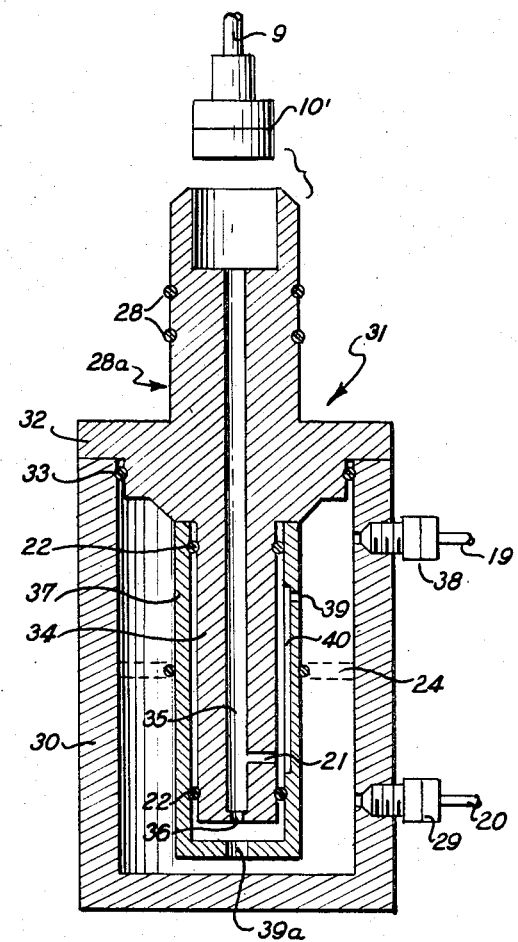

ICE CREAM MAKING MACHINE

This is a division of application Ser. No. 49,450 filed June 24, 1970, now U.S. Pat. No. 3,724,234 issued Apr. 3, 1973.

DESCRIPTION OF THE PRIOR ART

For the preparation of ice cream of the sherbet and soft ice types, it is customary to use machines in which a water based mixture of fatty substances and flavored essences (called a "mix") is emulsified with air. The mixture is conveyed to the ice cream making machine by means of a pump which has the combined function of drawing the mix from an open-topped container, of conveying it to the mixer-distributor, of forming the emulsion, and of maintaining the pressure in the ice cream maker.

In order to obtain the proper combination of air and liquid mix, the pump is usually made powerful enough for its effect to extend beyond the end of the feed line. This results in outside air being sucked in at the same time as the mix. The action of the mixer causes the air to be combined with the mix, and then, in the form of an emulsion, the two are cooled in the freezer.

The addition of air gives the mix, once it has been emulsified and frozen, a soft, pasty appearance, and it is of greater volume than the original mix (the ratio between the volume of the original mix and that of the ice cream product is known as the "overrun").

Such an arrangement has a number of drawbacks. First, the liquid mix is easily contaminated by bacteria from the outside air, and this represents a considerable health risk. Second, frothing is liable to occur in the container, thereby causing unrecoverable loss of the orriginal mix. Third, the operations of cleaning the pump and the container are difficult to carry out, and frequently require that they be taken to pieces, if only in part. Fourth, the mechanism of the device is complicated and has to be manufactured to very precise standards, thereby increasing the cost of the machine and, ultimately, of the ice cream. Fifth, the overrun is small, as it is a function of the power of the pump, and this is necessarily somewhat limited. And, finally, the value of the overrun is not constant, as it is linked to the viscosity of the mix, which is variable.

As a result of the above, it has been found difficult to produce ice cream economically and uniformly. Probably the major drawback lies in the fact that when air is added to the mix by dynamic means, it does not combine properly with the mix and does not form a truly stable emulsion. This makes it impossible to obtain a consistently high quality of really soft ice cream.

SUMMARY OF THE INVENTION

The present invention seeks to eliminate the aforementioned drawbacks.

According to the present invention, the ice cream making machine comprises an ice cream mixer-distributor, an emulsifier, a separate air-tight container for the liquid mix, a source of gas under pressure and a central core which is placed inside the container when the container is in use. The central core includes two tubes which open at their lower extremities into the container. One of the tubes is linked to the source of gas under pressure, and the other to the mixer-distributor. The emulsifier is placed outside the container, between the central core and the mixer-distributor.

With the machine according to the present invention, a stable emulsion can be obtained, in which the gas combines with the mix at a molecular level and the overrun obtained is of a high value.

The gas employed is preferably either nitrogen or carbon dioxide, as no bacteria can survive in these gases. The ice cream that is produced with these gases is therefore free from all bacteria, as there is no possibility of the ice cream being contaminated in the circuit of the ice cream making machine.

A further advantage of the machine according to the present invention lies in the fact that it can be used to prepare industrial quantities of the sherbet and soft ice types of ice cream from a mixture of syrup, flavored essences and water, without needing the adjunction of fatty substances. This cannot usually be achieved with conventional machines, because the air that is added to the mix in conventional machines can be retained only by the presence of fatty substances.

A further advantage of the instant machine lies in the fact that the separate containers which hold the liquid mix can easily be manufactured at the same place as where they are filled, are always ready for use, can be sterilized or pastuerized if necessary, and can be thrown away after use.

The machine according to the present invention is illustrated schematically and described by way of example only, in different embodiments, with reference to the attached drawings.

BRIEF DESCRIPTION OF THE DRAWINGS

FIG. 1 is a perspective view of the machine according to the present invention;

FIG. 2 is a cross-section of the central core of the machine illustrated in FIG. 1; and FIG. 3 is a cross-sectional view of the emulsifier of the machine illustrated in FIG. 1.

DESCRIPTION OF THE PREFERRED EMBODIMENTS

Referring now to the drawings in detail, wherein like reference numbers indicate like parts throughout the several figures, it will be seen that the ice cream making machine uses a separate, air tight, disposable container 1 to hold the mix 17, the container 1 being linked, on the one hand, to a source of gas under pressure 18 and on the other hand to a freezer mixer-distributor 11 (shown schematically). Power means (not shown) are provided for driving the mixer and refrigerating means (not shown) are provided for cooling the distributor. The container 1 has only one opening 2, which can be sealed by means of a collar 3.

The container 1 has a circular opening 2 in the top thereof which is fitted with the circular, cone-shaped collar 3 having a horizontal circular groove 27 integrally formed on the outside thereof for clamping engagement with the peripheral edge of the opening in the top of the container. Inwardly extending ribs 26 are formed on the inner wall of the collar for cooperation with seal 16 a core 4 to ensure that the container is air tight after the core has been inserted.

The container 1 is brought into use by means of the simplified central core 4 which is introduced through the opening at the top of the container 1. This central core includes a first or inlet passage 5 and a second or outlet passage 8. Passage 8 is connected to an outlet line 20 by means of a valve 10. Passage 5 is connected by valve 7 to an inlet line 6 leading from a source of gas pressure 18. The outlet line 20 is connected to a separate and independent, external emulsifier 31 by means of connecting valves 29. A feed line 19, connected to the source of gas under pressure 18, is connected to the emulsifier by valve 38.

As will be seen from FIG. 3, the emulsifier 31 consists of a vertical, flat-bottomed, cylindrical container 30, with two valves in the sidewall, the upper one 38 being for admission of the gas, and the lower 29 for admission of the liquid mix 17. A collared lid 32, having an air tight circular seal 33 is provided. The lid 32 has a collar member 28a formed integrally on its top, with circular sealing rings 28 being provided thereon. The lid 32 has on its underside an integral, downwardly extending cylindrical core 34. An internal passage 35 extends from the top of the collar 28a, through the lid 32 to the bottom of the core 34. The core 34 has an opening 36 at the bottom and a second opening 21 in the side, adjacent the bottom. The core 34 is surrounded by a cylinder 37 which has an opening 39 in its side near the top, an opening 39a in its bottom and a groove 40 leading from the level of the opening 39 to that of opening 21 in the core 34. Circular, horizontal seals 22 are placed between the core 34 and cylinder 37 above and below openings 21 and 39 to isolate the groove 40 from the rest of the space between the core 34 and the cylinder 37.

The emulsifier 31 may be linked directly to the ice cream mixer-distributor 11 through the collar 28a, which is kept air tight by its circular seals 28 or else it may be linked to the distributor by means of an outlet line 9 and a connecting valve 10', the outlet line 9 being connected to the ice cream mixer-distributor 11 by another connecting valve 12. The emulsifier 31 may have a circular, horizontal membrane 24 separating the liquid mix in the bottom of the container 30, from the pressurized gas in the upper half of the container, if desired.

Gas under under pressure enters container 1 through passage 5 and forces mix 17 out of the container through outlet line 20 to the emulsifier 31. Gas under pressure entering the emulsifier through line 19 passes through opening 39, groove 40 and opening 21 and thence upwardly through passage 35. When the gas flows upwardly into passage 35, the mix in the bottom of the emulsifier 31 will be drawn upwardly through openings 36 and 39a and will be mixed or emulsified with the gas, after which the emulsion will pass through line 9 to the mixer-distributor 11.

The containers 1 can be disconnected from the gas pressure source 18 and from the mixer-distributor 11 by means of the appropriate connecting valves, without there being any contact whatsoever between the liquid mix for making the ice cream and the outside, possibly polluted air, or any other foreign body. This represents a substantial step forward both from the commercial and from the technical points of view. It should furthermore be noted that when the bacteriologically pur gas is emulsified with the mix, the combination takes place at a molecular level, so that the water contained in the mix is caused to evaporate. This, in turn, ensures that the ice cream will be "dry" and of high quality.

What is claimed is:

1. In a machine for making ice cream that comprises an ice cream mixer-distributor; a source of gas under pressure; a disposable air tight container for holding liquid ice cream mix; a central core removably mounted to and extending downwardly into the disposable container from its top, the bottom of the central core being immersed in the mix; a first passage in the central core intersecting the central core periphery below the top of the mix; means connecting the first passage with the source of gas for permitting the introduction of gas under pressure into the mix; and a second passage in the central core intersecting the central core periphery below the top of the mix into which the mix under the gas pressure is conveyed; the improvement of an emulsifier comprising: a cylindrical open topped container; a lid sealingly engaged on the top of the container; a cylindrical core integrally formed on the underside of the lid and extending downwardly thereof in spaced relation to the container; a third passage extending from the top of the lid to the bottom of the cylindrical core; a first opening in the side of the cylindrical core adjacent its bottom intersecting the third passage; a second opening in the bottom of the cylindrical core intersecting the bottom of the third passage; a cylinder, surrounding the cylindrical core, located within the container in spaced relation to the cylindrical core and the container; a third opening extending through the bottom of the cylinder in communication with the second opening; a fourth opening extending through the side of the cylinder adjacent its upper part; a groove in the cylinder extending from the level of the fourth opening to the level of the first opening; seal means between the cylindrical core and the cylinder above the fourth opening; seal means between the cylindrical core and the cylinder below the first opening; first valve means, mounted to the container in communication with the fourth opening, adapted to be connected to the source of gas under pressure; and second valve means, mounted to the container in communication with the third opening, adapted to be connected to the second passage; the top of the third passage being adapted to be connected to the mixer-distribution; whereby the mix conveyed through the second passage passes through the third passage wherein it is mixed with gas passing through the first opening and is then conveyed to the mixer-distributor.

2. The emulsifier of claim 1 further comprising: an annular membrane disposed in sealing relation between the cylinder and the container below the fourth opening and the first valve means and above the third opening and the second valve means for preventing the gas entering the container through the first valve means from mixing with the mix entering the container through the second valve means in the space between the container and the cylinder.

3. A machine for making ice cream comprising, in combination: an ice cream mixer-distributor; a source of gas under pressure; a disposable air tight container for holding liquid ice cream mix; a central core removably mounted to and extending downwardly into the disposable container from its top, the bottom of the central core being immersed in the mix; a first passage in the central core intersecting the central core periphery below the top of the mix; means connecting the first passage with the source of gas for permitting the introduction of gas under pressure into the mix; and a second passage in the central core intersecting the central core periphery below the top of the mix into which the mix under the gas pressure is conveyed; and an emulsifier comprising a cylindrical open topped container; a lid sealingly engaged on the top of the container; a cylinder core integrally formed on the underside of the lid and extending downwardly thereof in spaced relation to the container; a third passage extending from the top of the lid to the bottom of the cylindrical core; a first opening in the side of the cylindrical core adjacent its bottom intersecting the third passage; a second opening in the bottom of the cylindrical core intersecting the bottom of the third passage; a cylinder, surrounding the cylindrical core, located within the container in spaced relation to the cylindrical core and the container; a third opening extending through the bottom of the cylinder in communication with the second opening; a fourth opening extending through the side of the cylinder adjacent its upper part; a groove in the cylinder extending from the level of the fourth opening to the level of the first opening; seal means between the cylindrical core and the cylinder above the fourth opening; seal means between the cylindrical core and the cylinder below the first opening; first valve means, mounted to the container in communication with the fourth opening, connected to the source of gas under pressure; and second valve means, mounted to the container in communication with the third opening, connected to the second passage; the top of the third passage being adapted to be connected to the mixer-distributor; whereby the mix conveyed through the second passage passes through the third passage wherein it is mixed with gas passing through the first opening and is then conveyed to the mixer-distributor.

* * * * *